US008253531B2

(12) United States Patent
Davis et al.

(10) Patent No.: US 8,253,531 B2
(45) Date of Patent: Aug. 28, 2012

(54) ON CHIP VERIFICATION AND CONSEQUENT ENABLEMENT OF CARD OS OPERATION IN SMART CARDS

(75) Inventors: John F. Davis, Durham, NC (US); Sheldon M. Osborne, Rochester, MN (US); Frederick I. Reed, III, Cary, NC (US); Wei Kai Xie, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 735 days.

(21) Appl. No.: 12/411,631

(22) Filed: Mar. 26, 2009

(65) Prior Publication Data

US 2010/0245037 A1    Sep. 30, 2010

(51) Int. Cl.
    G08B 21/00    (2006.01)
(52) U.S. Cl. .............. 340/5.53; 340/5.52; 340/10.1; 713/186; 726/9
(58) Field of Classification Search .......... 340/5.52, 340/5.53; 713/186; 726/9
    See application file for complete search history.

(56) References Cited

U.S. PATENT DOCUMENTS

| | | | | |
|---|---|---|---|---|
| 2003/0074568 | A1* | 4/2003 | Kinsella et al. | 713/186 |
| 2004/0093592 | A1* | 5/2004 | Rao | 717/168 |
| 2005/0248755 | A1* | 11/2005 | Chou et al. | 356/222 |
| 2006/0130128 | A1* | 6/2006 | Gorancic et al. | 726/9 |
| 2007/0279227 | A1* | 12/2007 | Juels | 340/572.1 |
| 2009/0050697 | A1* | 2/2009 | Sparks et al. | 235/382.5 |

OTHER PUBLICATIONS

"Fingerprint Cards launches first complete fingerprint verification system at less 10 USD/unit" Sep. 30, 2002; http.www.fingerprints.com/page.asp?newsID=114&section=news.
William Wong, "Fingerprint Sensor Integrates With Trusted Pre-Boot Authentication Systems," Oct. 26, 2006; http://electronicdesign.com/Articles/Index.cfm?AD=1&AD=1&ArticleID=13817.
Mimura et al., "Fingerprint Verification System on Smart Card", IEEE, pp. 182-183, 2002.

* cited by examiner

*Primary Examiner* — Jennifer Mehmood
*Assistant Examiner* — Mark Rushing
(74) *Attorney, Agent, or Firm* — Rabin & Berdo, P.C.

(57) ABSTRACT

On Chip Smart Card verification of a cardholder using biometrics such as a fingerprint and consequent enablement of a card operating system, having an additional software layer boot prior to the commercial card operating system booting. This software layer, or boot loader, provides the drivers and functionality for the finger print sensor and on-card matching. If the cardholder is successfully authenticated, the unmodified commercial OS is then allowed to boot. If the cardholder does not authenticate with the boot loader then the card does not boot the card operating system and thus cannot be used for financial transactions.

19 Claims, 4 Drawing Sheets

ON CHIP VERIFICATION AND CONSEQUENT ENABLEMENT OF CARD OS OPERATION IN SMART CARDS

BACKGROUND

1. Field of the Invention

The invention relates to biometric identification such as fingerprint verification. More particularly, the invention relates to a system for on chip verification and consequent enablement of card OS operation using smart cards.

2. Description of the Background

Smart cards are usually, although not necessarily, the size of a standard credit card, but contain some form of electrical circuitry, usually in the form of one or more integrated circuits (ICs). Simple smart cards may function only as a memory, but more complex ones include a Central Processing Unit (CPU), so as to be able to process data in various ways. This processing is often limited to controlling access to the memory in some way or other, to prevent unauthorized changes to the data stored there.

An example of a smart card is shown in FIG. 4, which shows a card 490 including a CPU 400 with a card operating system 410 and contacts 430 to connect to external readers and biometric sensors, for example.

Various operating systems have been implemented in smart cards having a CPU. Early smart card operating systems were dedicated to a single application for using the card, whereas later operating systems have been developed for multiple applications, and Java cards have also been developed, in which the Java operating system is employed so that applications could be portable between cards.

Smart cards have been used as credit cards, charge cards, and debit cards, as well as for access to mass transit and parking, to store health records, as identity badges, and for secure access to a Local Area Network (LAN), as well as in cellular phones and cable TV set-top boxes, amongst other applications. However, to date there has not been a viable commercial application of on card verification of a cardholder using biometrics such as a fingerprint. Present identity verification schemes generally either rely upon cryptography, or rely upon biometric identity verification that does not take place on the card itself.

Operating systems from commercial vendors such as Giesecke & Devrient GmbH (G&D) exist which have on-chip fingerprint matching, but an off-card reader scans the fingerprint. There are also companies such as Fidelica Microsystems, Inc. that provide on chip finger print sensors and verification but they use a proprietary, experimental OS and not a commercial grade publicly available OS.

BRIEF SUMMARY

A method is provided for biometric authentication for a smart card, including bootstrap loading the smart card with an input/output operating system, checking whether a flag is set, reading biometric information of a user under control of the input/output operating system to authenticate the user if the flag is not set, setting the flag if the user is authenticated according to the biometric information, and loading the smart card with a card operating system if the flag is set, the card operating system being distinct from the input/output operating system.

In one embodiment, the reading of the biometric information of the user comprises reading a fingerprint of the user. In one embodiment, the reading of the fingerprint is performed by a fingerprint sensor integrated into the smart card. In another embodiment the reading of the biometric information of the user is performed by a sensor integrated into the smart card. The indication of whether the flag is set or not set may be done via a storage bit in a non-volatile random access memory, or alternatively, via a capacitor. In one embodiment, the flag may be cleared after a preset time delay.

In another embodiment of the present invention, a computer program product for biometric authentication of a smart card user is provided, the computer program product including a computer readable medium, having computer readable program code embodied in the computer readable medium, the computer readable program code including instructions to bootstrap load the smart card with an input/output operating system, instructions to check whether a flag is set, instructions to read biometric information of a user under control of the input/output operating system to authenticate the user if the flag is not set, instructions to set the flag if the user is authenticated according to the biometric information, and instructions to load the smart card with a card operating system if the flag is set, the card operating system being distinct from the input/output operating system.

In yet another embodiment of the present invention, a biometrically authenticated smart card is provided, including a central processing unit, a first media storing an input/output operating system to bootstrap load the smart card and control the central processing unit before a card operating system is loaded, storage for storing a flag, which is set by the central processing unit if a user is authenticated, a biometric information reader to authenticate a user under control of the input/output operating system if the flag is not set, and a second media storing a card operating system to be loaded into the smart card if the flag is set, the card operating system being distinct from the input/output operating system.

DETAILED DESCRIPTION

Figure 1:
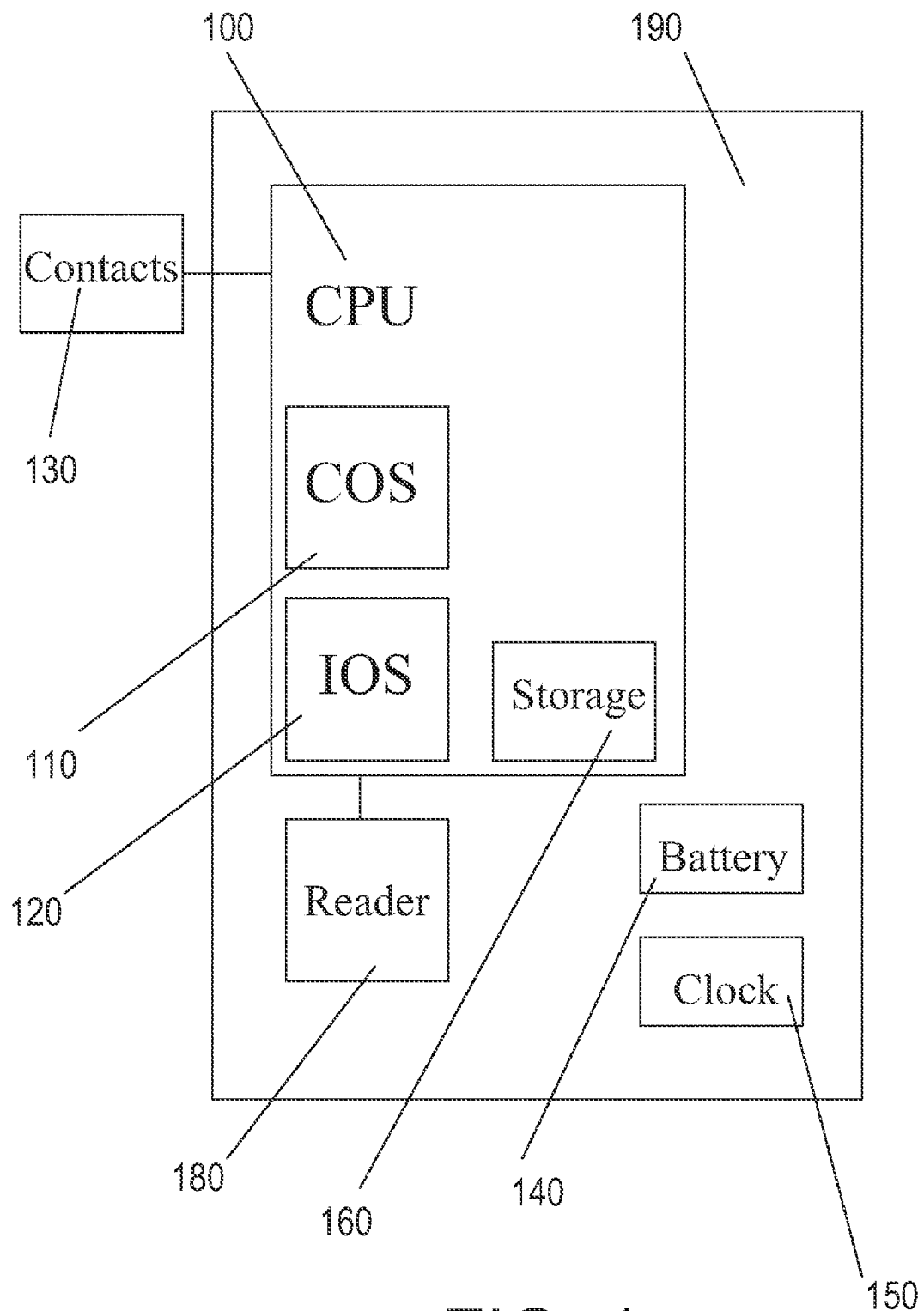
FIG. 1 shows the architecture of a system according to a preferred embodiment of the invention.

The proposed system is a practical implementation of a system where existing fingerprint or other biometric technology can be integrated with an existing commercial operating system without extensive modifications to the operating system.

One problem that the Applicants have identified with the background art is that smart cards that have biometric identification capability, such as fingerprint identification, require the use of a separate fingerprint reader or biometric reader that is not part of the smart card itself. This limits the use of such smart cards, such that biometric identification is not possible when they are used with existing smart card readers that do not incorporate biometric identification hardware.

Another problem that the Applicants have identified with the background art is that on-chip fingerprint readers known in the art are not compatible with commonly available operating systems.

In one aspect of the invention a smart card is provided where a fingerprint reader or other biometric reader is integrated into the card itself. The biometric reader may also be, for example, a retinal scanner.

In another aspect of the invention a smart card is provided that is compatible with standard operating systems.

These and other aspects of the present invention may employ the system for on chip verification and consequent enablement of card OS operation using smart cards of the exemplary embodiment disclosed herein.

In a preferred embodiment, the system works by having an additional software layer 'boot', i.e. bootstrap load itself into a working memory, prior to the commercial card operating system booting. This software layer, or boot loader, provides the drivers and functionality for the finger print sensor and on-card matching. The boot loader will also be referred to as the input/output operating system, or IOS. If the cardholder is successfully authenticated, it then allows an unmodified commercial operating system to boot. Such a commercial operating system for smart cards is referred to herein as a card operating system, Card OS or COS. If the cardholder does not authenticate with the boot loader then the card does not boot the card operating system and thus cannot be used for financial transactions.

An advantage of the invention is the use of a monolithic CPU architecture as currently exists in smart cards. A single CPU is more practical since power and physical real estate is scarce on a smart card. A further advantage of the invention is the use of an existing, unmodified, card operating system. Modifications to the card operating system are expensive to construct and expensive to certify. Yet another advantage of the invention is that it provides a secure means to use a smartcard with biometric authentication with minimal development effort.

The invention will now be described in more detail by way of example with reference to the embodiments shown in the accompanying figures. It should be kept in mind that the following described embodiments are only presented by way of example and should not be construed as limiting the inventive concept to any particular physical configuration.

Further, if used and unless otherwise stated, the terms "upper," "lower," "front," "back," "over," "under," and similar such terms are not to be construed as limiting the invention to a particular orientation. Instead, these terms are used only on a relative basis.

The present invention is directed toward a system for on chip verification and consequent enablement of operation of a card operating system (Card OS) using smart cards.

FIG. 1 shows the architecture of a system according to a preferred embodiment of the invention.

In a preferred embodiment, the card 190 has one CPU 100 but two different operating systems; a conventional card operating system (COS) 110 obtained from a vendor and a custom built I/O (input/output) operating system (IOS) 120. The COS 110 is used to perform financial transactions in the case of a credit card smart card using, communicating using known connection standards such as ISO 7816/10536/14443/15693 with a Point of Sale (POS) reader (not shown). COS 110 is preferably not modified, but is used in its existing form as obtained from the vendor. Contacts 130 comply with ISO 7816 in the exemplary embodiment shown. The IOS 120 is used to authenticate a user to the card using a user interface peripheral 180, which can include an on-card fingerprint sensor, or other biometric information reader. The card 190 has a battery 140 and clock 150 so that it can operate independently of a card reader. The card 190 uses storage 160 to hold a "card holder authenticated" flag, e.g. by storing a bit indicating if the flag is set. Storage 160 can be, for example, a non-volatile RAM (NVRAM), or a resistor/capacitor (RC) network set via a General purpose I/O (GPIO) pin.

Figure 2:
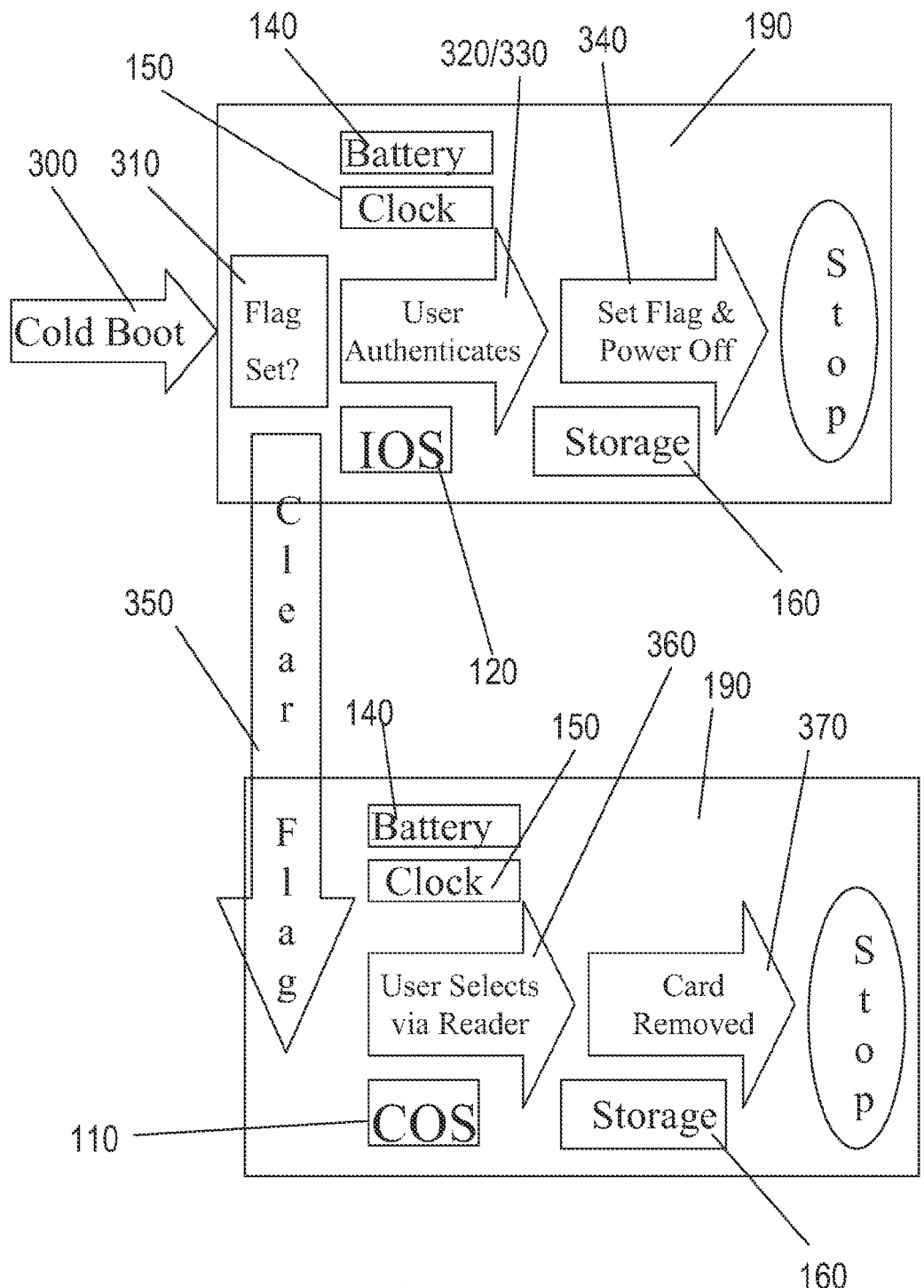
FIG. 2 shows functional operation of the system a according to FIG. 1.

FIG. 2 shows functional operation of the system according to FIG. 1.

The IOS 120 is always booted first when power is applied. Its purpose is to check if the card 190 is in a "card holder authenticated" mode by reading the status of the flag from storage 160. If the cardholder or user has not been authenticated, then the cardholder is prompted to authenticate using the peripheral 180, which can include an integral finger print sensor or other biometric sensor as previously noted. If the cardholder has already authenticated, the normal card operating system is allowed to boot. If the storage 160 used to hold the flag is an NVRAM, for example, the user can authenticate and then boot the Card OS 110 much later. If the flag is kept in a resistor/capacitor network, then the authentication is allowed to time-out after a given time, i.e. the flag is set by charging a capacitor, but the charge leaks away via a resistor, according to the time constant RC of the network as per well-known principles. Hence, the flag may be cleared, that is to say reset to a not set state, after a preset period of time.

Figure 3:
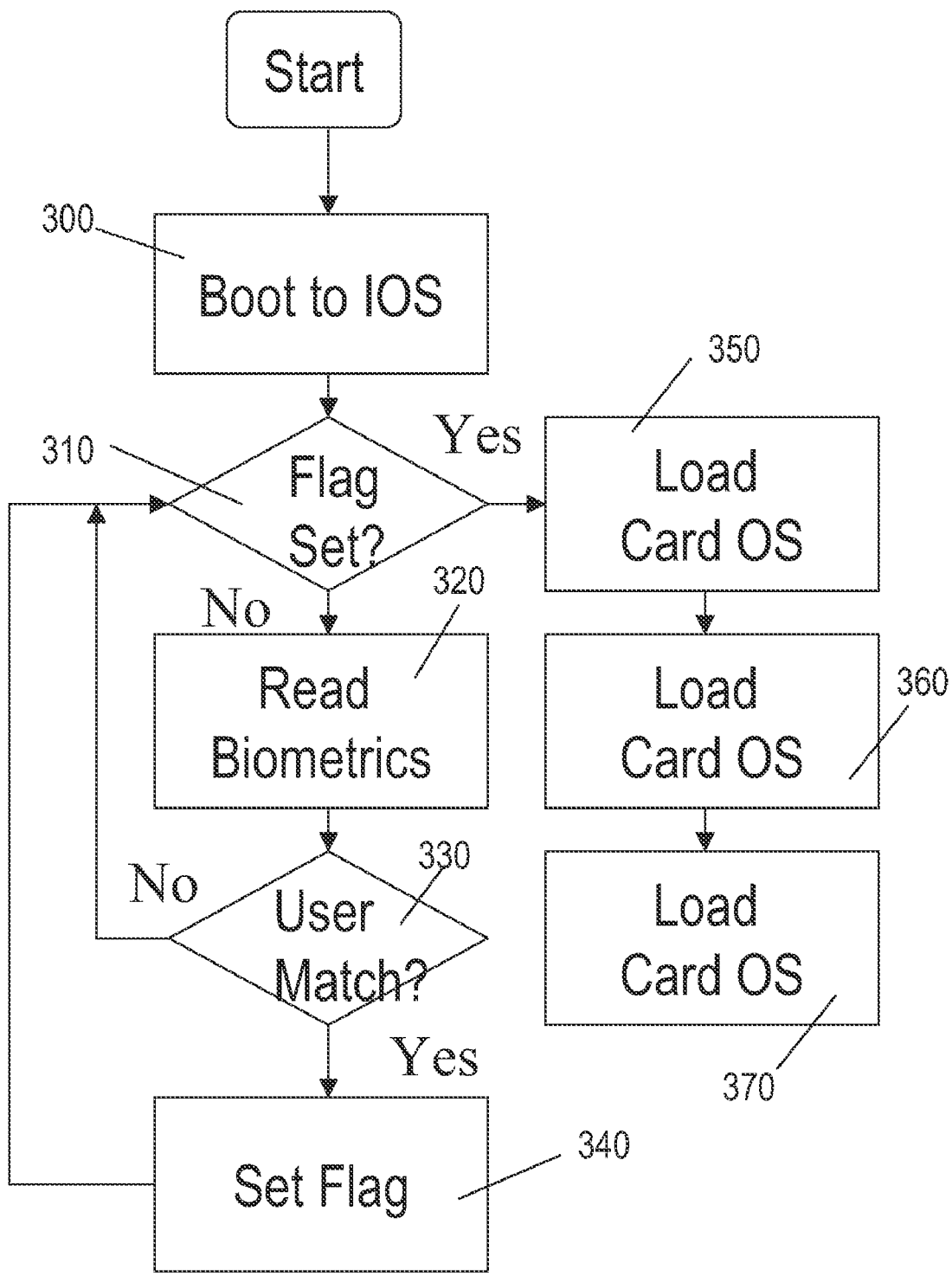
FIG. 3 is a flowchart of a method of according to the invention.
Figure 4:
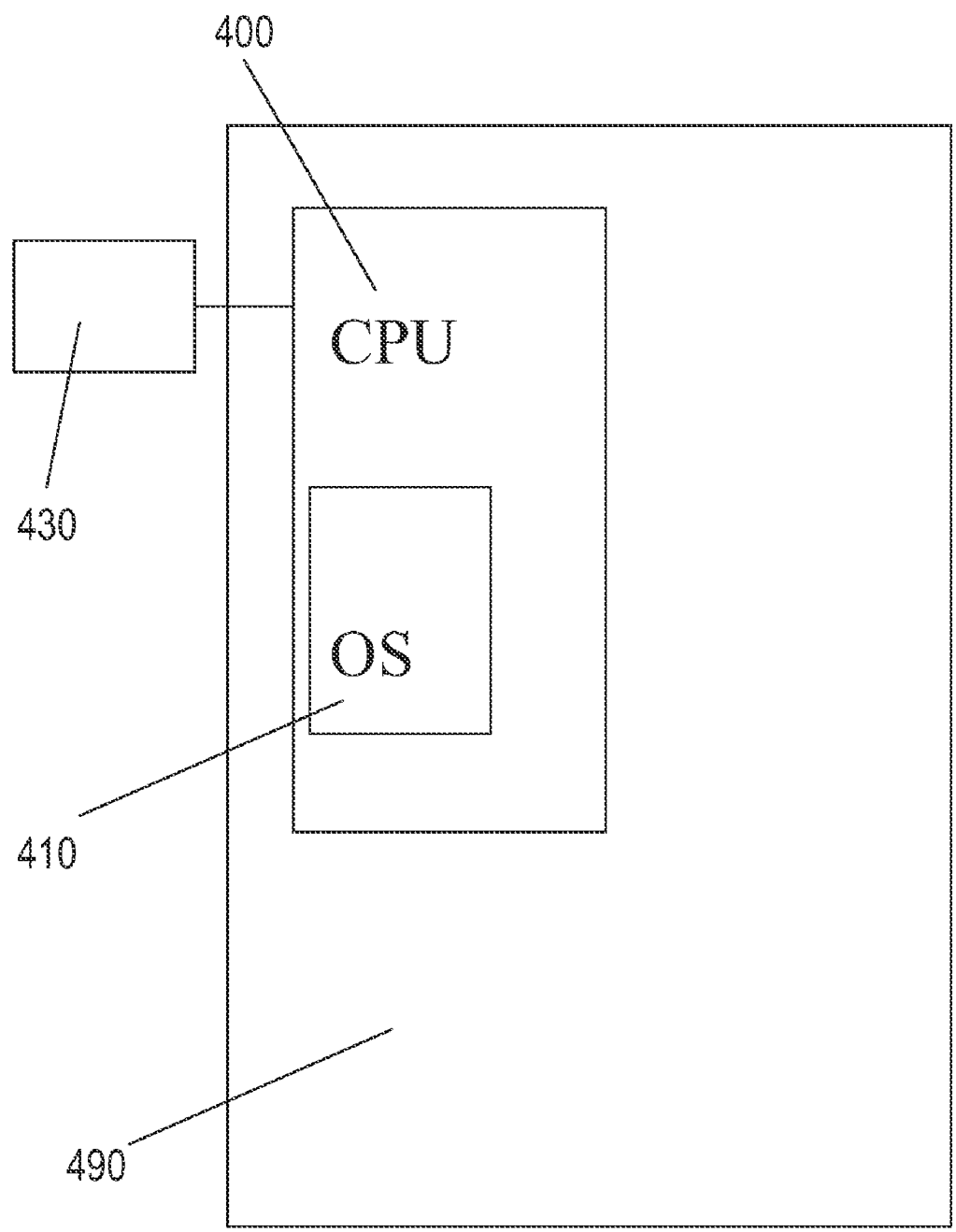
FIG. 4 shows a smart card according to the prior art.

FIG. 3 is a flowchart illustrating the method of the invention.

In step 300 the smart card boots to the IOS 120, then in step 310 the flag in storage 160 is checked. If step 310 detects that the flag is not set, then the method proceeds to read the user's biometric information in step 320, and in step 330 the biometric information is checked for a match. If the biometric information matches and the user is authenticated, then in step 340 the flag is set and then the method returns to step 310, and if not the method returns directly to step 310. If step 310 detects that the flag is set, then in step 350 the card OS is enabled to be loaded, although it may actually be loaded later, subject to a time-out time, and the flag is cleared. In step 360, the user selects a smart card application via the reader, and in step 370 the card is removed.

It should be understood, however, that the invention is not necessarily limited to the specific process, arrangement, materials and components shown and described above, but may be susceptible to numerous variations within the scope of the invention. For example, although the above-described exemplary aspects of the invention are believed to be particularly well suited for smart cards, it is contemplated that the concepts of the present invention can be applied in other applications. For example, the concepts of the present application can be utilized whenever it is desired to verify biometric information before starting a computer operating system.

In addition, embodiments of the present invention may also be delivered as part of a service engagement with a corporation, nonprofit organization, government entity, internal organizational structure, or the like. Aspects of these embodiments may include designing, deploying, and configuring a computing system containing the systems and/or practicing the methods described herein. Further aspects of these embodiments may include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

It will be apparent to one skilled in the art that the manner of making and using the claimed invention has been adequately disclosed in the above-written description taken together with the drawings.

It will be understood that the above description of the preferred embodiments are susceptible to various modifications, changes and adaptations, and the same are intended to be comprehended within the meaning and range of equivalence of the appended claims.

What is claimed is:

1. A method of biometric authentication for a smart card, comprising:
bootstrap loading the smart card with an input/output operating system;
checking whether a flag is set;
reading biometric information of a user under control of the input/output operating system to authenticate the user if the flag is not set;
setting the flag if the user is authenticated according to the biometric information; and
loading the smart card with a card operating system if the flag is set, the card operating system being distinct from the input/output operating system.

2. The method according to claim 1, wherein reading the biometric information of the user comprises reading a fingerprint of the user.

3. The method according to claim 2, wherein reading the fingerprint is performed by a fingerprint sensor integrated into the smart card.

4. The method of claim 1, wherein reading the biometric information of the user is performed by a sensor integrated into the smart card.

5. The method of claim 1, comprising storing a bit, indicating whether the flag is set or not set, in a non-volatile random access memory.

6. The method of claim 1, comprising storing a bit, indicating whether the flag is set or not set, in a capacitor.

7. The method of claim 1, further comprising clearing the flag after a preset time delay.

8. A computer program product for biometric authentication of a smart card user, the computer program product comprising:
a non-transitory computer readable medium having computer readable program code embodied therewith, the computer readable program code including:
instructions to bootstrap load the smart card with an input/output operating system;
instructions to check whether a flag is set;
instructions to read biometric information of a user under control of the input/output operating system to authenticate the user if the flag is not set;
instructions to set the flag if the user is authenticated according to the biometric information; and
instructions to load the smart card with a card operating system if the flag is set, the card operating system being distinct from the input/output operating system.

9. The computer program product according to claim 8, wherein the instructions to read the biometric information of the user comprise instructions to read a fingerprint of the user.

10. The computer program product according to claim 9, wherein the instructions to read the fingerprint cause a fingerprint sensor integrated into the smart card to operate.

11. The computer program product of claim 8, wherein the instructions to read the biometric information of the user cause a sensor integrated into the smart card to operate.

12. The computer program product of claim 8, comprising instructions to store a bit, indicating whether the flag is set or not set, in a non-volatile random access memory.

13. The computer program product of claim 8, comprising instructions to store a bit, indicating whether the flag is set or not set, in a capacitor.

14. The smart card of claim 8, comprising a non-volatile random access memory configured to store a bit indicating whether the flag is set or not.

15. The smart card of claim 8, comprising a capacitor configured to store a bit indicating whether the flag is set or not.

16. The smart card of claim 15, wherein the capacitor is part of a network comprising a resistor, whereby the flag is cleared after a time delay determined by the time constant of the resistor and the capacitor.

17. A biometrically authenticated smart card, comprising:
a central processing unit;
first media storing an input/output operating system configured to bootstrap load the smart card and control the central processing unit before a card operating system is loaded;
storage for storing a flag, which is set by the central processing unit if a user is authenticated;
a biometric information reader configured to authenticate a user under control of the input/output operating system if the flag is not set; and
second media storing a card operating system configured to be loaded into the smart card if the flag is set, the card operating system being distinct from the input/output operating system.

18. The smart card according to claim 17, wherein the biometric information reader is a fingerprint sensor.

19. The smart card of claim 17, wherein the biometric information reader is integrated into the smart card.

* * * * *